Aug. 12, 1924.
C. F. GREEN
FUEL TANK SUPPORT
Original Filed Nov. 14, 1918    4 Sheets-Sheet 3
1,504,751
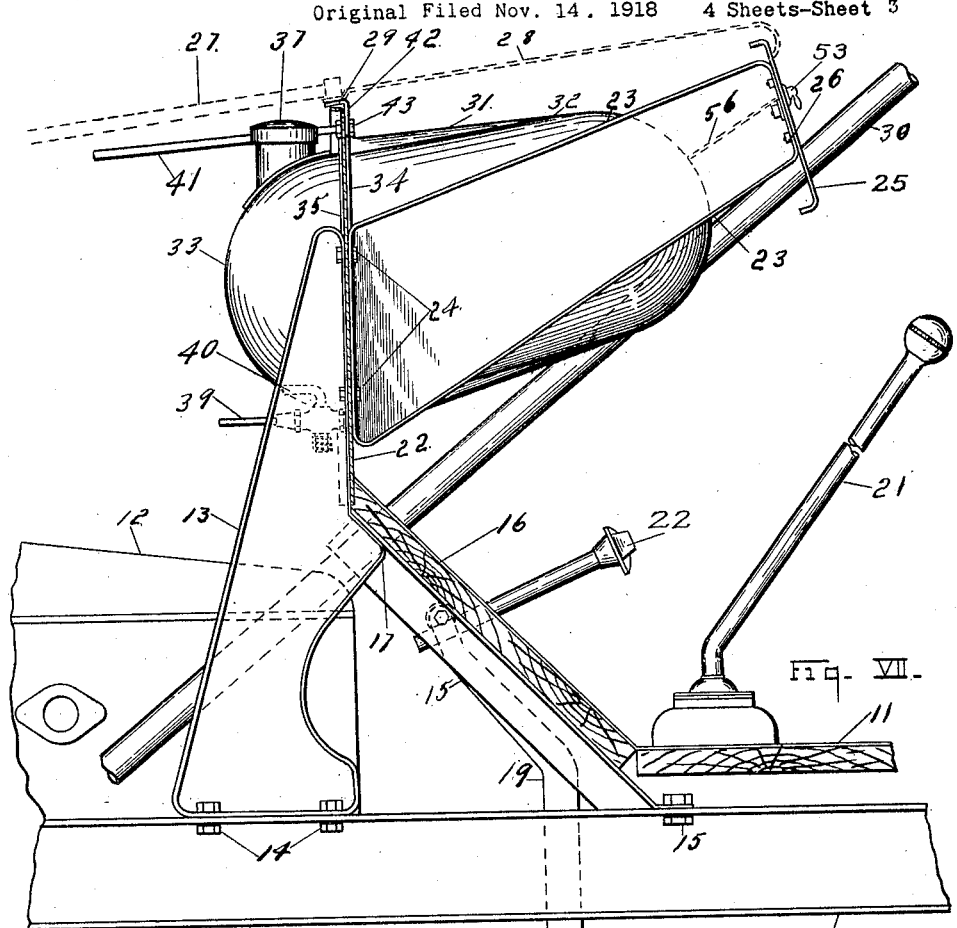
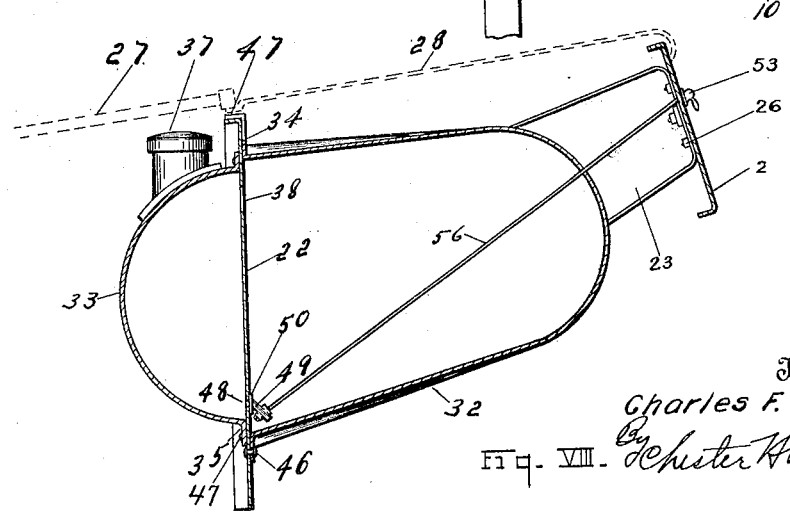
Inventor
Charles F. Green
By Chester H Braselton
Attorney Aug. 12, 1924.
C. F. GREEN
FUEL TANK SUPPORT
1,504,751
Original Filed Nov. 14, 1918    4 Sheets-Sheet 4
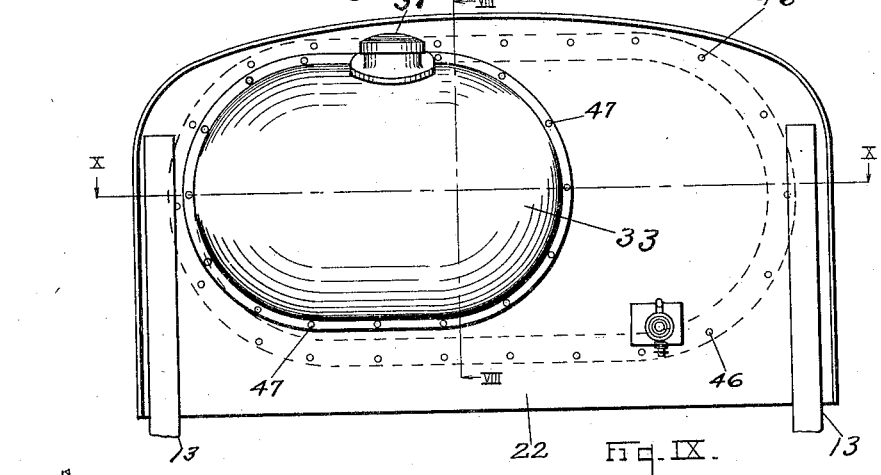
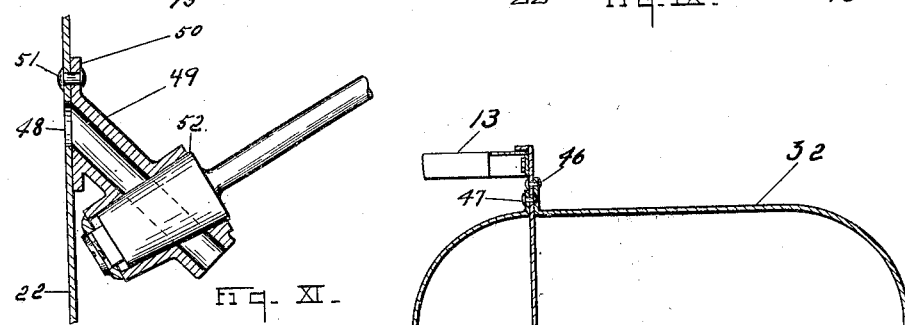
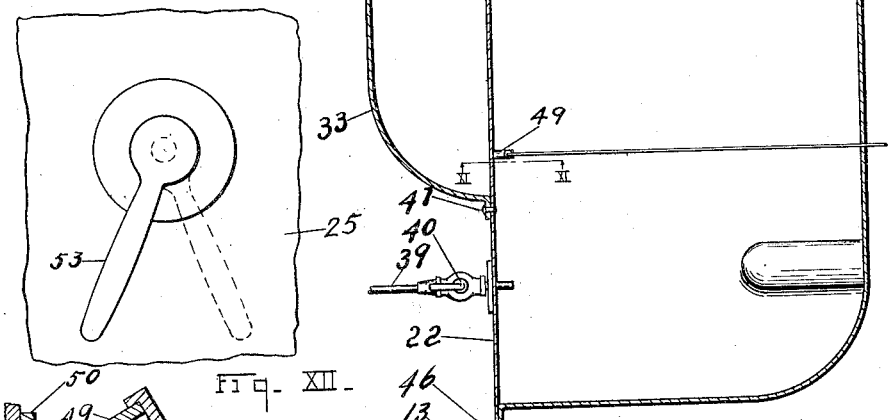
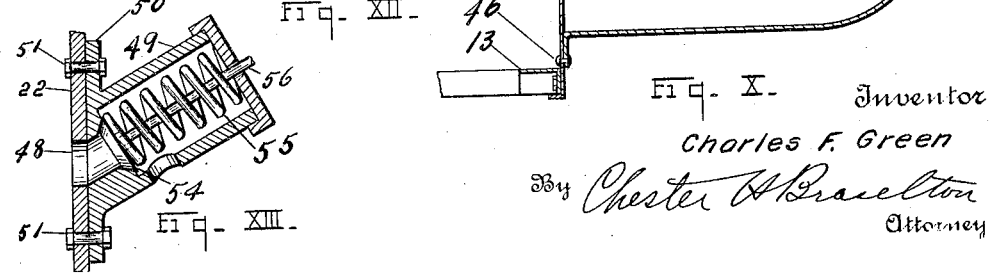
Inventor
Charles F. Green
By Chester H. Braselton
Attorney Patented Aug. 12, 1924.

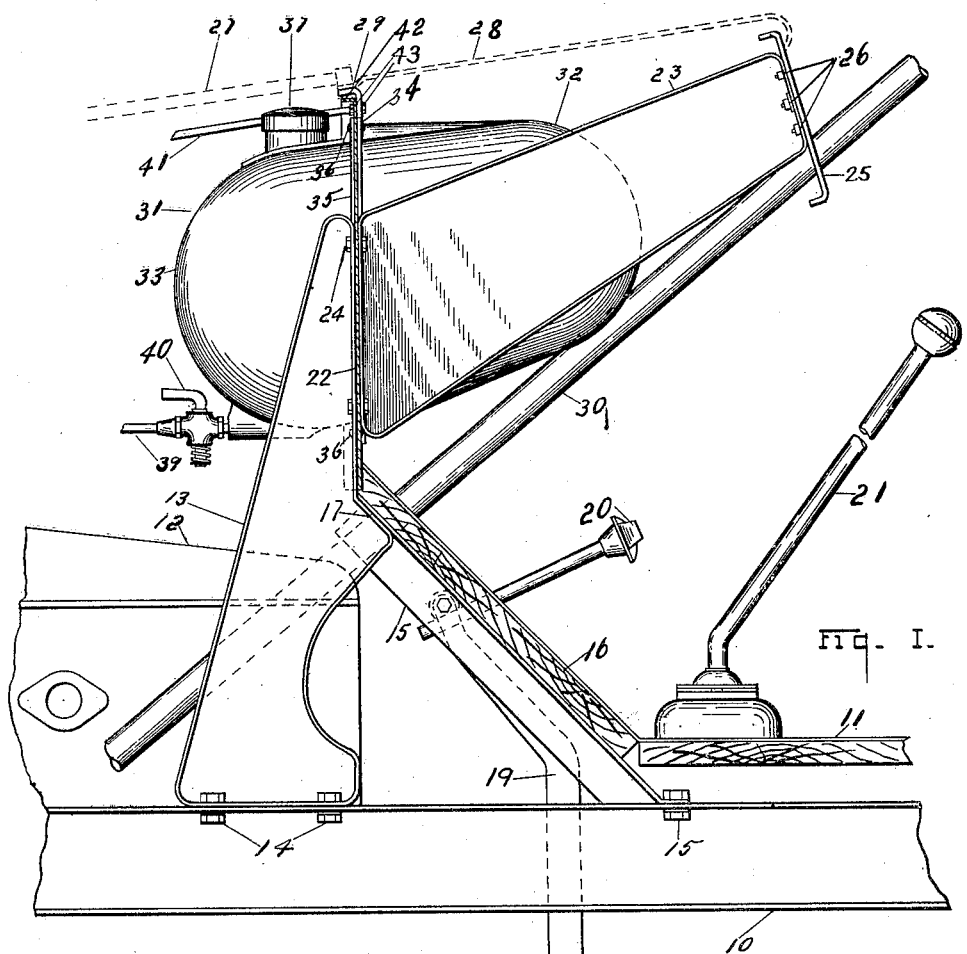
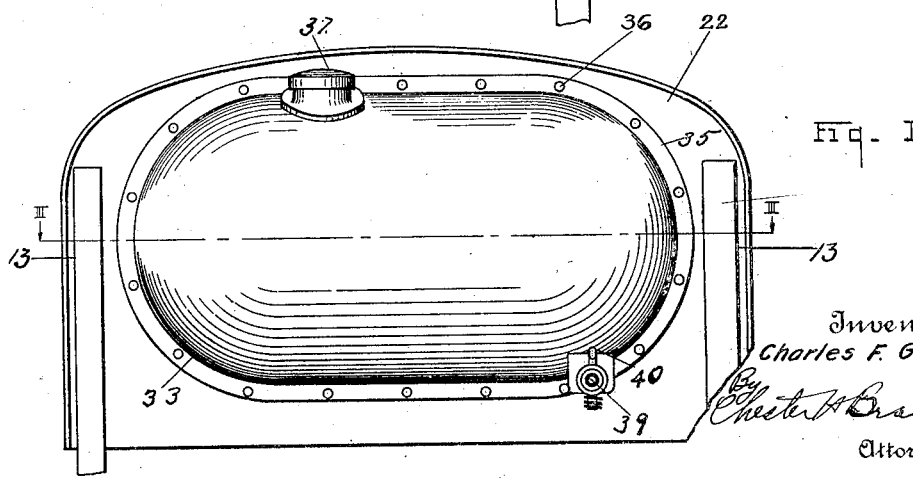

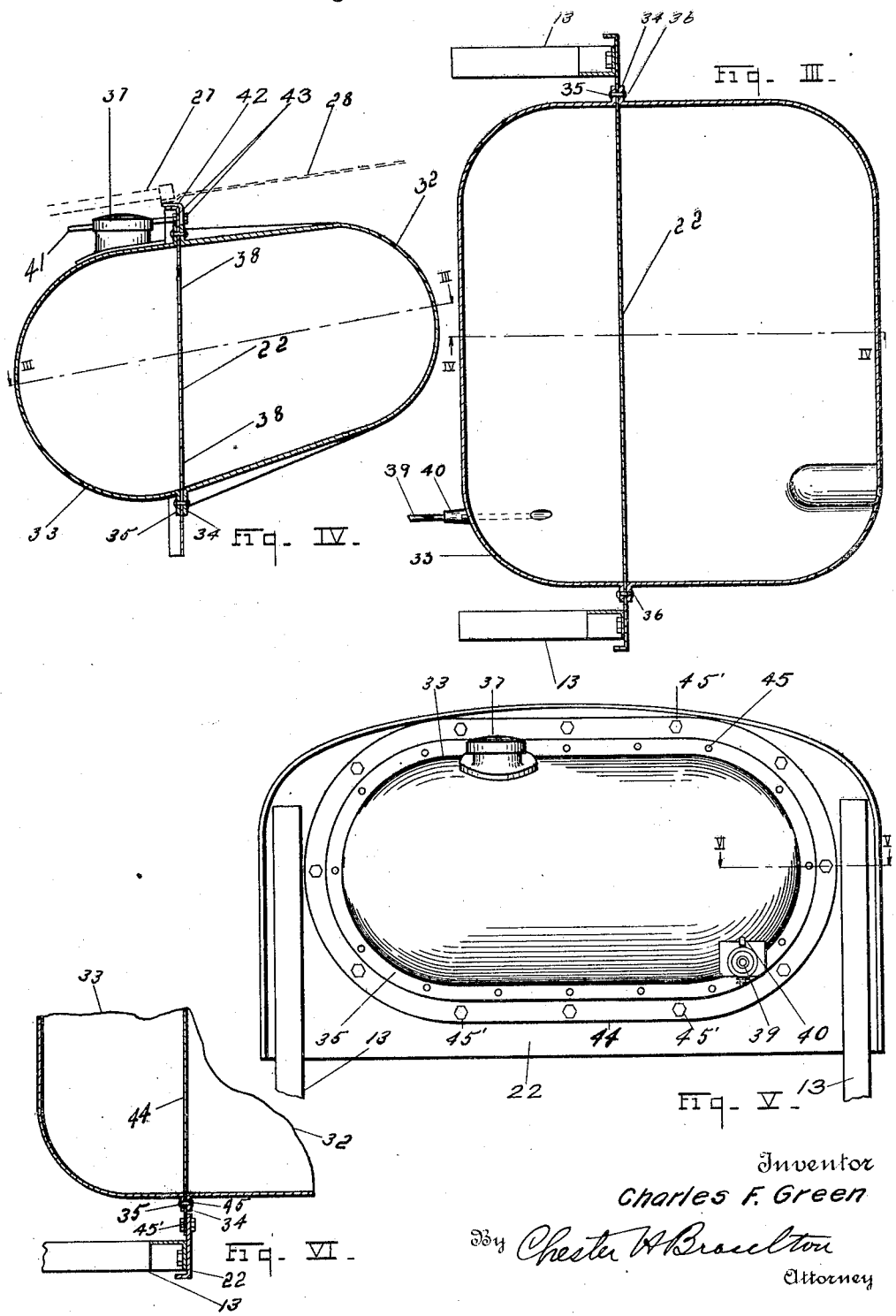

1,504,751

UNITED STATES PATENT OFFICE.

CHARLES F. GREEN, OF DEFIANCE, OHIO, ASSIGNOR TO INDUSTRIAL RESEARCH CORPORATION, OF TOLEDO, OHIO, A CORPORATION OF DELAWARE.

FUEL-TANK SUPPORT.

Application filed November 14, 1918, Serial No. 262,535. Renewed January 8, 1924.

*To all whom it may concern:*

Be it known that I, CHARLES F. GREEN, a citizen of the United States, residing at Defiance, county of Defiance, and State of Ohio, have invented certain new and useful Improvements in Fuel-Tank Supports, of which I declare the following to be a full, clear, and exact description.

This invention relates to motor vehicles and has for its object to provide more particularly improvements in the construction and manner of supporting the fuel supply tank thereof.

One object of my invention is to provide a fuel tank for an automobile in which a portion of the dash board will serve as a splash board within the tank.

Another object of this invention is to provide a fuel tank of simple construction, provided with a splash board therein.

Another object of this invention is to provide a fuel tank having a reserve supply section connected therewith.

Further objects and objects relating to economy of manufacture and details of construction, will definitely appear from the detailed description to follow.

I accomplish the object of my invention by the devices and means described in the following specification and illustrated in the accompanying drawings. My invention is fully described in the specification and pointed out in the appended claims.

A structure constituting one embodiment of my invention which may be the preferred, is illustrated in the accompanying drawing, forming a part of this specification, in which:

Fig. I is a side elevation of a portion of an automobile frame, showing the location of the fuel tank with relation to the remaining structure of the automobile.

Fig. II is a front elevation showing the manner of attaching the fuel tank to the dash board.

Fig. III is a horizontal sectional view of the fuel tank taken along the line III—III of Figs. II and IV.

Fig. IV is a vertical sectional view of the fuel tank taken along line IV—IV of Fig. III.

Fig. V is a front elevation of a modified form of the fuel tank showing the manner of its attachment to the dash board.

Fig. VI is a horizontal sectional view of a portion of the fuel tank taken along the line VI—VI of Fig. V.

Fig. VII is a side elevational view of a portion of the frame of an automobile, showing the position of the fuel tank with respect to the other portion of the automobile frame, and the location of the hand lever operating the valve to the reserve fuel supply tank.

Fig. VIII is a vertical section view taken along the line VIII—VIII of Fig. IX.

Fig. IX is a front elevation of the fuel supply tank, and its manner of attachment to the dash board as shown in Fig. VII.

Fig. X is a horizontal sectional view taken along the line X—X of Fig. IX.

Fig. XI is a vertical section view showing one form of valve which may be used between the main fuel supply tank and the reserve fuel supply tank, taken along the line XI—XI of Fig. X.

Fig. XII is a view of the handle for operating the valve between the main supply tank and the reserve fuel supply tank.

Fig. XIII is a vertical sectional view of a modified form of valve which may be used between the main fuel supply tank and the reserve supply tank.

In the drawings, similar reference characters refer to corresponding parts throughout the several views, and the sectional views are taken looking in the direction of the small arrows at the end of the section lines.

Referring to the drawings, 10 represents the side frame member of an automobile by which the floor 11 and the engine 12 are supported in the usual manner. A standard 13 is secured to each of the side members 10 by bolts 14 at a point near the rear end of the engine. Diagonal braces 15 are secured to the side members 10 by a bolt 15' and are attached to the standards 13 at 17 in any well known manner as by welding. The toe-board 16 extends at an angle to the main floor 11, and is supported in position by the diagonal braces 15. The usual clutch actuating lever 19 is adapted to be operated by the pedal 20 which extends through the toe-board, and the usual gear-shift lever is represented at 21.

A dash board 22 is provided with a forwardly extending marginal flange 29 and is attached to the rear faces of the upright standards 13.

Supports 23 are attached to the standards 13 by means of bolts 24 which pass through the dash 22 and flanges upon the meeting portions of the standards and supports, the said supports extend upwardly and rearwardly from their point of attachment to the standard 13 and carry the instrument board 25 attached thereto by bolts 26.

The usual hood and cowl portion of the automobile are shown in dotted lines and indicated by reference characters 27 and 28 respectively, and 30 designates the usual steering post.

The fuel tank as a whole is designated by the reference character 31 and comprises two sections, designated by the reference characters 32 and 33 respectively, the section 32 being provided with an annular outturned flange 34 along its edge, while the section 33 is provided with a similar flange 35. In the forms shown in Figs. I to IV inclusive the sections of the fuel tank are assembled in position by being placed each with its open end against the dash 22 upon opposite sides thereof and attached thereto and to each other by common bolts or rivets 36. It is obvious that a sealing strip may be interposed between the edge of each of the sections of the fuel tank and the corresponding side of the dash, if desired, for the purpose of preventing any leakage of the fuel therefrom. A filling opening is provided for the front section of the fuel tank which is normally closed by a cap 37 and is so positioned as to be readily accessible upon lifting one of the hood portions. That portion of the dash which is enclosed between the sections of the fuel tanks when they are in an assembled position, is provided with a plurality of openings 38, which permits the fuel to pass from one section to the other with the necessary freedom of movement, while that section of the dash which is enclosed between the sections of the fuel tank, acts as a splash-board to prevent the fuel in the tank from rushing bodily through the entire length of the tank and pounding against the ends of the tank when the automobile is in motion.

A conduit leading from the fuel tank 31 is shown at 39 and is connected with the tank through a cutout valve 40.

At the upper central part of the dash 22 is mounted the rear end of the tie-rod 41 connecting the dash to the radiator, (not shown) the rear end of which extends through an opening in the dash 22 and through the reinforcing plate 42 and is connected therewith by clamping nuts 43.

In the modification shown in Figs. V and VI, the two sections 32 and 33 of the fuel tank are provided with annular out-turned flanges 34 and 35 respectively, as shown in Figs. III and IV. This modification differs from the structure shown in Figs. III and IV in that instead of being assembled from opposite sides of the dash 22, a separate plate 44 is provided to serve as a splash-board, and sections 32 and 33 are positioned from opposite sides of the splash-board 44 and attached thereto by means of rivets 45 extending through the annular outturned flanges upon the sections of the fuel tank and splash-board 44. The splash-board 44 extends beyond the marginal edges of the out-turned flanged portions 34 and 35 as shown on Fig. V, and is attached to the edge of an opening formed in the dash-board 22 for the reception of the fuel tank, by means of bolts or rivets 45'. This construction permits of a ready removal of the fuel tank from the dash board at all times upon the removal of the bolts 45'.

In the construction shown in Figs. VII to X inclusive, the sections 32 and 33 of the fuel tank are so constructed that the open ended portion of these sections differ considerably in area, and consequently separate means are used for attaching the two sections to the dash. It is to be understood, however, that the sections may be formed with their open ends of the same cross-sectional area, and attached to the dash by common fastening means, as shown in Figs. I to VI, if desired. In the construction shown in Figs. VII to X inclusive the sections 32 and 33 are formed with out-turned marginal flanges as in the other figures of the drawing, the section 32 being attached to the dash by means of bolts or rivets 46 passing through the marginal flanges of the section 32 and the dash, while the section 33 is attached in a similar manner to the opposite side of the dash by bolts or rivets 47. In the construction shown in Figs. VII to X inclusive the lower opening 38 in the splash-board separating the two portions of the fuel tank is omitted, while the upper opening 38 as shown in Figs. III and IV is retained. Consequently the section 32 serves as the main portion of the fuel tank, while the section 33 serves as a reserve fuel tank. The reserve portion of the fuel tank is connected to the main portion thereof, near the lower edge, by an opening 48 in communication with the short pipe 49 provided with a flange 50 which is connected with the splash-board section of the dash 22 by bolts or rivets 51. The pipe 49 is provided with a rotatable valve 52 as shown in Fig. XI, which is controlled by the hand lever 53 mounted on the instrument board as shown in Figs. VII and XII.

Fig. XIII shows a modified form of valve 54 for closing the opening between the reserve fuel supply and the main fuel supply sections of the tank, this valve being normally seated by a spring 55. The valve 54 has connected therewith an operating rod 56 which is adapted to extend to a point upon the instrument board 25 and be operated in any suitable manner therefrom. The conduit 39 communicates with the main portion 32 of the fuel tank, as shown in Fig. X, and is provided with a cut-out valve 40 as shown. It will be seen that that portion of the dash-board 22, which serves as a partition between the sections 32 and 33 of the fuel tank, as shown in the form illustrated in Figs. VII to X inclusive, serves as a splash-board when the liquid is at or near the level of the upper opening 38 as shown in Fig. VIII but when the level of the liquid falls below the level of the upper opening 38, that portion of the dash board which separates the sections 32 and 33 of the fuel tank, serves as a partition to perform the additional function of preventing the fuel in this section 33 from being drained into the section 32 until the main section 32 is nearly exhausted or until it is found desirable to use the reserve supply, when by opening the valve in the pipe 49 the operator may use the reserve supply of the fuel contained in section 33. It is to be noted, that in the form shown in Figs. VII to X inclusive, that portion of the dash board which separates the sections 32 and 33 of the fuel tank performs the function of a splash-board even when the level of the liquid has reached a point below the opening 38 in the upper portion of the partition, in that it separates the tank into two sections and thus prevents the surging of the liquid through the entire length of the tank during the movement of the automobile.

The construction and operation of this device will be apparent from the above description. The fuel tank sections are stamped from thin blanks of sheet metal or otherwise formed in any suitable manner and assembled upon opposite sides of the dash or upon opposite sides of a separate plate which is adapted to be firmly secured to the dash, so that the tank is positioned in the space beneath the cowl and rear portion of the hood, where it is readily accessible at all times, and occupies space not otherwise utilized. As stated above when the open ends of the two sections are formed so that they are of equal cross-sectional area the sections are preferably attached together and to the dash by common fastening means, although they may be attached to the dash separate if desired. It will be noted also that by attaching the sections of the fuel tank to opposite sides of the dash, and a portion of the dash utilized as a splash-board there is a consequent saving of material, and the tank is very securely supported by the dash. By the omission of the lower opening 38 in the splash-board and the substitution of a valve-controlled opening therefor, a reserve fuel supply section is provided whereby a quantity of fuel is always held in reserve for use in the event of the main supply of fuel becoming exhausted when on the road.

While I have shown and described my invention as applied to that type of automobile wherein the dash is carried by two standards supported upon the frame of the automobile, it is to be understood that my improved fuel tank may be applied quite as readily to that type of automobile in which the dash is carried directly by the body of the vehicle, and it is not my intention to limit its use to any particular form or arrangement of frame structure.

It will be noted that my fuel tank is positioned in close proximity to the engine so that a relatively short and easily accessible conduit supplies the fuel to the carbureter, while from the position of the tank the fuel will be fed to the carbureter by gravity and therefore the provision of auxiliary means for feeding the fuel to the engine is rendered unnecessary.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

Having thus described my invention, what I claim as new and desire to secure by Letters Patent is:

1. In a device of the class described, in combination; a vehicle frame; a dash carried by said frame, a fuel tank formed of mating sections secured to opposite sides of the dash and connected thereto by common fastening means.

2. In a device of the class described, in combination; a dash; a fuel tank formed of mating sections secured to opposite sides of the dash and connected thereto by common fastening means.

3. In a device of the class described, in combination, a vehicle frame; a dash carried by said frame; a fuel tank formed of sections secured to opposite sides of the dash, that portion of the dash separating the sections of the fuel tank being provided with a plurality of openings communicating with the interior portions of the sections.

4. In a motor vehicle, the combination of the vehicle frame; a dash carried by said frame; a fuel tank formed of sections secured to opposite sides of the dash, whereby that portion of the dash separating the sections acts as a splash-board for the fuel tank.

5. In a motor vehicle, the combination of a dash; a fuel tank formed of sections secured to opposite sides of the dash, whereby that portion of the dash separating the sections acts as a splash-board for the fuel tank.

6. In a motor vehicle, the combination of a vehicle frame, a pair of standards carried by said frame, a dash secured to the standards, a pair of arms secured to said standards and projecting from said dash, a fuel tank formed of sections secured to opposite sides of the dash and connected thereto.

7. In a motor vehicle, in combination a vehicle frame, a pair of standards carried by said frame, a dash secured to said standards, and a fuel tank formed of sections positioned on opposite sides of the dash and supported thereby.

8. In a motor vehicle, in combination with a vehicle frame, a dash carried by said frame, and a fuel tank formed of sections positioned upon opposite sides of the dash and firmly secured thereto.

9. In a motor vehicle, in combination a vehicle frame, a pair of standards carried by said frame, a dash secured to said standards, a fuel tank formed of sections positioned upon opposite sides of the dash, and a splash-board separating the sections of the fuel tank and provided with openings therein.

10. In a device of the class described in combination, a vehicle frame, a dash carried by said frame, and a fuel tank formed of sections positioned upon opposite sides of said dash and supported thereby.

11. In a device of the class described in combination, a dash, and a fuel tank formed of sections positioned upon opposite sides of said dash and supported thereby.

12. In a device of the class described in combination, a dash, a fuel tank formed of sections positioned upon opposite sides of said dash and supported thereby, and a splash-board separating the sections of the fuel tank and provided with openings therein.

13. In a device of the class described, a dash, a fuel tank formed of sections positioned upon opposite sides of said dash and supported thereby, and a splash-board separating the sections of the fuel tank to form a main fuel supply section and a reserve fuel supply section.

14. In a device of the class described, in combination, a vehicle frame, a dash carried by said frame, a fuel tank formed of sections positioned upon opposite sides of the said dash and supported thereby, a portion of the dash forming a splash-board separating the sections of the fuel tank to form a main fuel supply section and a reserve fuel supply section.

15. In a device of the class described, in combination, a vehicle frame, a dash carried by said frame, a fuel tank formed of sections positioned on opposite sides of said dash and supported thereby, and a splash-board separating the sections of the fuel tank to form a main fuel supply section and a reserve fuel supply section, and a valve controlled opening in the splash-board for admitting fuel from the reserve fuel supply section to the main fuel supply section at the will of the operator.

16. In a device of the class described in combination, a dash, a fuel tank formed of sections positioned upon opposite sides of said dash and supported thereby, a splash-board separating the sections of the fuel tank to form a main fuel supply section and a reserve fuel supply section, and means for admitting fuel from the reserve fuel supply section to the main fuel supply section at the will of the operator.

17. In a device of the class described, in combination a dash, a fuel tank comprising sections secured to opposite sides of said dash, and means carried by the dash and located within the tank for admitting fuel from one section to the other at the will of the operator.

18. In a device of the class described, in combination, a dash, a fuel tank attached to said dash and supported thereby, a portion of the dash forming a splash-board for separating the said tank into two sections, and means for admitting fuel from one section to the other at the will of the operator.

19. In a device of the class described, in combination, a vehicle frame, a dash carried thereby and provided with an opening therein, a splash-board having tank sections mounted upon opposite sides thereof to form a fuel tank, and means for supporting the splash-board upon the dash with one of the tank sections extending through the opening therein.

20. In a device of the class described, in combination, a vehicle frame, a dash carried thereby and provided with an opening therein, a fuel tank, a splash-board having its edges extending circumferentially from the fuel tank, and means for supporting the splash-board upon the dash with one of the tank sections extending through the opening therein.

21. In a motor vehicle, in combination, a frame, a dash carried by said frame, oppositely arranged fuel tank sections separated by the dash, and having free communication above a predetermined point and means adapted to establish communication between said sections below said predetermined point.

22. In a motor vehicle, in combination, a frame, a dash carried by the frame, oppositively arranged fuel tank sections separated by the dash and having free communication above a predetermined point, an instrument board connected with the frame, a valve for controlling a passageway between said sections and actuating means for the valve operable from the instrument board.

23. In a device of the class described, in combination a dash, a fuel tank supported thereby, an instrument board spaced from said dash, said tank having a partition therein separating it into two sections, and means carried by said partition and operable from said instrument board for admitting fuel from one section of the tank to the other.

In testimony whereof, I affix my signature.

CHARLES F. GREEN.